United States Patent
Andrews et al.

(10) Patent No.: US 10,638,356 B2
(45) Date of Patent: Apr. 28, 2020

(54) TRANSMISSION OF NETWORK SLICING CONSTRAINTS IN 5G WIRELESS NETWORKS

(71) Applicant: NOKIA TECHNOLOGIES OY, Espoo (FI)

(72) Inventors: Matthew Andrews, Chatham, NJ (US); Sem Borst, Maplewood, NJ (US); Siegfried Klein, Stuttgart (DE); Silvio Mandelli, Stuttgart (DE); Tsunehiko Chiba, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 98 days.

(21) Appl. No.: 16/042,888

(22) Filed: Jul. 23, 2018

(65) Prior Publication Data
US 2020/0029242 A1    Jan. 23, 2020

(51) Int. Cl.
*H04W 24/10* (2009.01)
*H04W 74/04* (2009.01)
*H04W 72/04* (2009.01)
*H04W 28/02* (2009.01)
*H04W 72/08* (2009.01)
*H04W 28/10* (2009.01)

(52) U.S. Cl.
CPC ....... *H04W 28/0268* (2013.01); *H04W 24/10* (2013.01); *H04W 72/046* (2013.01); *H04W 72/087* (2013.01)

(58) Field of Classification Search
CPC ............. H04W 28/0268; H04W 24/10; H04W 72/046; H04W 72/04; H04W 84/00; H04L 41/044; H04L 41/0803; H04L 41/5003; H04L 41/50
See application file for complete search history.

(56) References Cited

U.S. PATENT DOCUMENTS

| 9,775,045 B2* | 9/2017 | Li | H04W 16/02 |
| 2018/0077024 A1* | 3/2018 | Zhang | H04L 41/044 |
| 2018/0124661 A1* | 5/2018 | Tsai | H04W 24/10 |

(Continued)

FOREIGN PATENT DOCUMENTS

| WO | 2017200978 A1 | 11/2017 |
| WO | 2018075828 A1 | 4/2018 |

OTHER PUBLICATIONS

Ferrús, et al., "Management of Network Slicing in 5G Radio Access Networks: Functional Framework and Information Models", IEEE, Submitted for possible publication, 16 pages.

(Continued)

*Primary Examiner* — Ahmed Elallam
(74) *Attorney, Agent, or Firm* — Brake Hughes Bellermann LLP

(57) ABSTRACT

A 5G network communicates per-slice constraints for QoS parameter values from a centralized unit (CU) to a MAC scheduler of a distributed unit (DU). The CU communicates these per-slice constraints, rather than or in addition to per-DRB constraints, to the MAC scheduler over the CU/DU interface. In some implementations, the CU/DU interface is an F1 air interface as defined in specification 38.473 in the 3GPP standard. In some implementations, the DU provides per-slice performance feedback over the CU/DU interface. Based on such feedback, the CU may adjust the per-slice QoS constraints.

20 Claims, 5 Drawing Sheets

(56) References Cited

U.S. PATENT DOCUMENTS

| | | | | |
|---|---|---|---|---|
| 2018/0316564 | A1* | 11/2018 | Senarath | H04L 63/20 |
| 2018/0376407 | A1* | 12/2018 | Myhre | H04W 76/27 |
| 2019/0021010 | A1* | 1/2019 | Senarath | H04L 41/0816 |
| 2019/0124181 | A1* | 4/2019 | Park | H04W 76/27 |
| 2019/0124572 | A1* | 4/2019 | Park | H04W 76/27 |
| 2019/0174498 | A1* | 6/2019 | Samdanis | H04W 16/10 |
| 2019/0182752 | A1* | 6/2019 | Lou | H04W 24/02 |
| 2019/0182875 | A1* | 6/2019 | Talebi Fard | H04W 76/11 |
| 2019/0223088 | A1* | 7/2019 | Pateromichelakis | H04L 41/044 |
| 2019/0327153 | A1* | 10/2019 | Wahlqvist | H04L 41/5019 |
| 2019/0335366 | A1* | 10/2019 | Jin | H04W 76/27 |
| 2019/0350035 | A1* | 11/2019 | Kim | H04W 76/10 |
| 2019/0357119 | A1* | 11/2019 | Hong | H04L 1/1614 |
| 2019/0364541 | A1* | 11/2019 | Ryu | H04W 76/25 |

OTHER PUBLICATIONS

Ferrús, et al., "On 5G Radio Access Network Slicing: Radio Interface Protocol Features and Configuration", IEEE Communications Magazine, Accepted for Publication, 9 pages.

Pateromichelakis, et al., "Service-Tailored User-Plane Design Framework and Architecture Considerations in 5G Radio Access Networks", IEEE Access, vol. 5, Aug. 7, 2017, pp. 17089-17105.

* cited by examiner

US 10,638,356 B2

TRANSMISSION OF NETWORK SLICING CONSTRAINTS IN 5G WIRELESS NETWORKS

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

In addition, 5G wireless networks may support network slicing, wherein a single physical network may be sliced into multiple virtual networks. Each network slice may include a set of logical network functions that may support the requirements of a particular use case.

SUMMARY

According to an example implementation, a method includes: receiving, by processing circuitry of a centralized unit (CU), per-slice constraint data representing a constraint on a quality of service (QoS) parameter for a network slice of a set of network slices of a communications network; and sending, by the processing circuitry, the per-slice constraint data to a scheduling entity of a distributed unit (DU), the DU being associated with a cell of the communications network, the scheduling entity being configured to generate a schedule of a transmission of communications data for the cell, the schedule being based on the constraint on the QoS parameter for the network slice.

According to an example implementation, a method includes receiving, by processing circuitry of a distributed unit (DU), per-slice constraint data representing a constraint on a quality of service (QoS) parameter for a network slice of a set of network slices of a communications network; and generating, by the processing circuitry of the DU, a schedule of a transmission of communications data for the cell, the schedule being based on the constraint on the QoS parameter for the network slice.

According to an example implementation, an apparatus includes a centralized unit (CU), a distributed unit (DU) including a scheduling entity, the DU being associated with a cell of a communications network, and the CU being configured to send per-slice constraint data to the scheduling entity of the DU, the per-slice constraint data representing a constraint on a quality of service (QoS) parameter for a network slice of a set of network slices of the communications network.

The details of one or more examples of implementations are set forth in the accompanying drawings and the description below. Other features will be apparent from the description and drawings, and from the claims.

DETAILED DESCRIPTION

Figure 1:
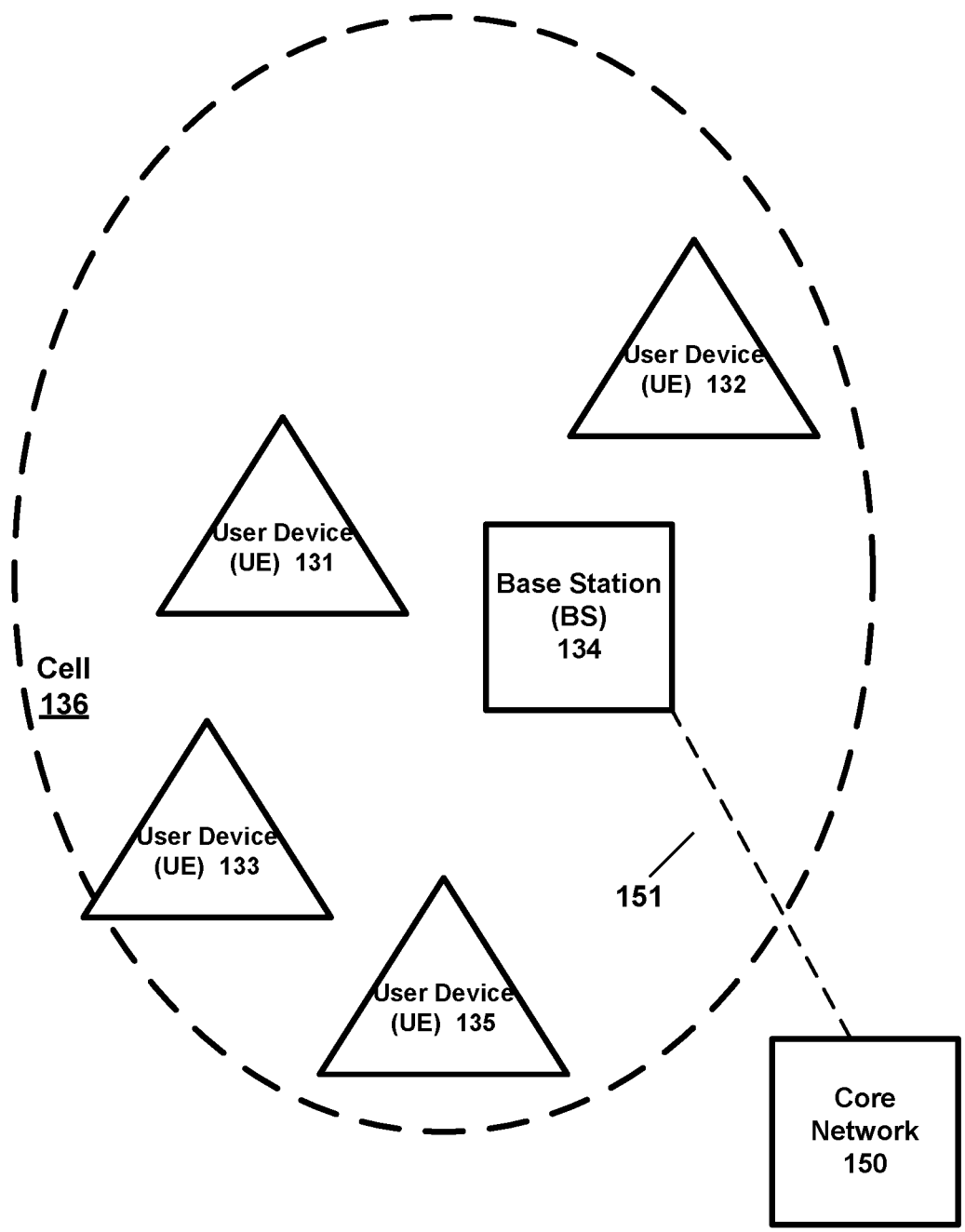
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), enhanced mobile broadband, massive machine type communications (MMTC), vehicle-to-vehicle (V2V), vehicle-to-device, etc. Each of these use cases, or types of UEs, may have its own set of requirements.

In addition, 5G wireless networks may support network slicing, wherein a single physical network may be sliced into multiple virtual networks. Each network slice may include, for example, a set of logical network functions that may support the requirements of a particular use case. Network Slicing may allow differentiated treatment depending on requirements of different UEs or groups of UEs. With slicing (network slicing), an operator can create networks for optimized solutions based on different service requirements, QoS (quality of service), functionality, performance, etc. By way of illustrative example, a network slice may include, for example, a portion of one or more network resources at one or more network entities, such as a portion of, e.g., one or more of computational resources, memory resources, hardware resources, software or functional resources, and/or other network resources at a BS and/or at one or more core network entities, for example, that may support a group of UEs or support a particular use case.

According to an example implementation, a UE and/or group of UEs, e.g., with similar QoS requirements or running the same or similar application, providing a common feature or functionality, for a particular use case, or other common aspect, may support a network slice or may be allocated or assigned to a network slice, e.g., where a network slice identifier (or slice identifier) may identify the network slice. However, different UEs (e.g., different type of UEs) and/or each different group of UEs, which may be assigned to different network slices, may have different service requirements. According to an example implementation, different UEs and/or each of multiple groups of UEs may be assigned to a different network slice.

Furthermore, a UE may have a number of different applications and/or data flows (e.g., protocol data unit sessions) that may generate and/or receive traffic or data. Therefore, a UE may be allocated to multiple network slices, e.g., based on different types of traffic that may be transmitted to or from the UE, different applications running on a UE, or different use cases that the UE may support. Therefore, a UE may be allocated to or allowed to use a plurality of network slices.

According to an example implementation, a slice may be identified by a slice identifier, which may include one or more of the following: a slice/service type (SST); a slice/service type (SST) and slice differentiator (SD); and a single Network Slice Selection Assistance Information (S-NSSAI). For example a SST may indicate a service type, such as a specific 5G wireless service type, such as ultra-reliability low latency communications (URLLC), Internet of Things (IoT), enhanced mobile broadband (eMBB), massive machine type communications (MMTC), etc. Thus, for example, a network slice may be allocated to or associated with a specific service type. A slice differentiator (SD) may further allow a differentiation between different slices of the same type (e.g., to allow differentiation between two URLLC network slices that may be assigned to different groups of URLLC UEs, for example). Also, according to an example implementation, a S-NSSAI may be another type of slice identifier. According to an example implementation, a S-NSSAI=SST+SD (e.g., S-NSSAI may include or may be a combination of or concatenation of a SST and a SD for a slice), for example.

As noted, each of the different wireless service types (e.g., URLLC, IoT, eMBB, mMTC) may have different requirements in terms of, e.g., latency, QoS, minimum data rates, etc. As a result, in some cases, different wireless services/service types (e.g., URLLC, IoT, eMBB, mMTC) may be prioritized for service differently by a wireless network. Because each network slice may be associated with or allocated to a specific wireless service type (e.g., URLLC, IoT, eMBB, mMTC), this means that, at least in some cases, a wireless network may prioritize some network slices over other network slices.

In an example implementation of 5G networks, service level agreements (SLAs) will be expressed in terms of per-slice quality of service (QoS) parameter values, e.g., min/max aggregate bit rate, min/max aggregate share of gNB air interface resources, max latency. Currently, such networks are operated under constraints related to individual dedicated radio bearers (DRBs). Such constraints make it difficult to comply with SLAs. Further, providing constraints to DRBs reduces the operational flexibility of a 5G network.

Therefore, according to an example implementation, an improved 5G network communicates per-slice constraints for QoS parameter values from a centralized unit (CU) to a MAC scheduler of a distributed unit (DU). The CU communicates these per-slice constraints, rather than or in addition to per-DRB constraints, to the MAC scheduler over the CU/DU interface. In some implementations, the CU/DU interface is an F1 air interface as defined in specification 38.473 in the 3GPP standard. In some implementations, the DU provides per-slice performance feedback over the CU/DU interface. Based on such feedback, the CU may adjust the per-slice QoS constraints.

Advantageously, communicating per-slice constraints on QoS parameter values provides improved operational flexibility. Moreover, the per-slice constraints better align operation of the network with SLAs.

Figure 2:
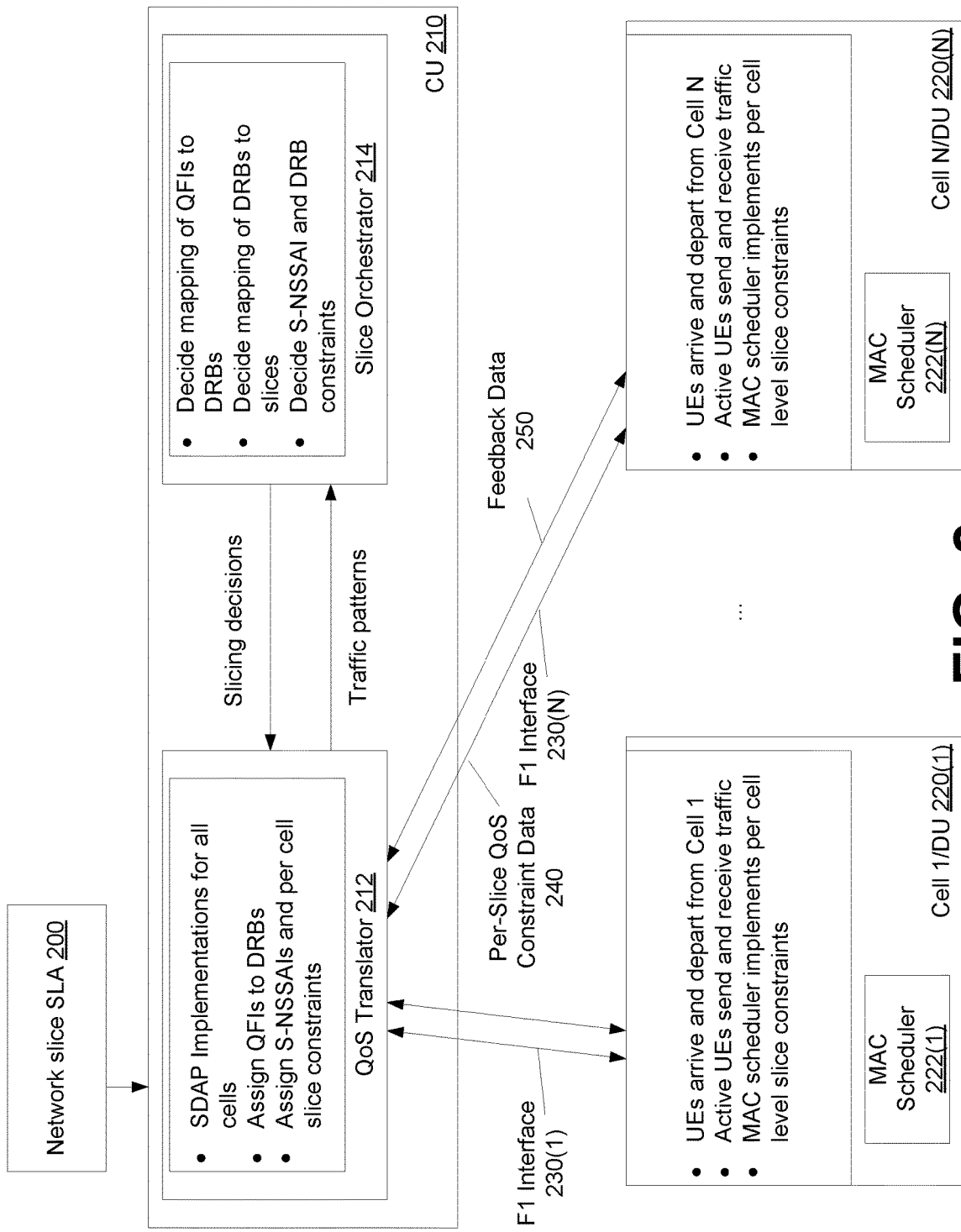
FIG. 2 is a diagram illustrating an architecture for slice QoS enforcement according to an example implementation.

FIG. 2 is a diagram illustrating an architecture for per-slice QoS enforcement. This architecture includes a centralized unit 210 and a set of DUs 220(1), . . . , 220(N). In some implementations, N=1. In some implementations, N>1.

As defined by specification 38.401 of the 3GPP, the CU 210 is a logical node hosting radio resource control (RRC), service data adaptation protocol (SDAP), and packet data convergence protocol (PDCP) protocols of the gNB or RRC and PDCP protocols of the en-gNB that controls the operation of one or more DUs, e.g., 220(1), . . . , 220(N). In some implementations, the CU 210 is associated with, and connected to, a set of base stations (BSs). The CU 210 as shown in FIG. 2 is configured to receive, obtain, or generate QoS constraints. Moreover, the CU 210 includes a QoS translator 212 and a slice orchestrator 214.

The QoS translator 212 is configured to send per-slice QoS constraint data 240 to a MAC scheduler, e.g., MAC scheduler 222(N) over an F1 air interface, e.g., F1 air interface 230(N). In some implementations, the per-slice QoS constraint data 240 takes the form of a slice identifier, a QoS parameter identifier and a per-slice constraint value. In some implementations, the per-slice QoS constraint data 240 also includes a min/max flag value indicating whether the per-slice constraint value represents a maximum allowed value or a minimum allowed value.

In some implementations, a QoS parameter is an aggregate bit rate for a network slice. In some implementations, a QoS parameter is a percentage share of air interface (e.g., F1 interface) resources allocated to the network slice. In some implementations, a QoS parameter is a packet latency for at least one data flow for a cell. Accordingly, an example of QoS constraint data 240 may take the following form: S-NSSAI=1 (slice ID), QoS parameter identifier="BIT RATE," constraint value=100 Mb/sec, and flag value="MIN." In this case, the QoS constraint data would correspond to a guarantee of at least 100 Mb/sec allocated to slice 1.

The slice orchestrator 214 is configured to allocate resources to each slice and DRB and communicate those allocations to the QoS translator. For example, the slice orchestrator 214 determines a distribution or mapping of QoS flows, identified by a QoS flow identifier (QFI) to DRBs within the communications network. The slice orchestrator then determines a mapping of DRBs to slices within the communications network. Finally, the slice orchestrator 214 determines the QoS constraints for each of the slices within the communications network, based on SLAs 200 for each network slice. In some implementations, the slice orchestrator 214 may also determine QoS constraints for each DRB as well.

Accordingly, once the slice orchestrator 214 communicates the per-slice QoS constraints to the QoS translator 212, the QoS translator 212 may then perform SDAP implementations for all cells. The QoS translator 212 also assigns QFIs to the DRBs and assigns S-NSSAIs (i.e., slice identifiers) and per-cell QoS slice constraints to those S-NSSAIs prior to sending the per-cell QoS slice constraints 240 to a MAC scheduler, e.g., MAC scheduler 220(N) over the F1 interface 230(N). The SDAP implements the assignments by marking QFIs with DRB identifiers and marking DRBs with S-NSSAIs.

The DUs 220(1), . . . , 220(N) are configured to implement the per-cell QoS slice constraints received from the CU 210 via a respective MAC scheduler 221(1), . . . , 222(N). For example, within DU 220(N), UEs may arrive and depart. Active UEs within that cell 220(N) may send and receive communications data traffic. The time intervals and frequency bands assigned to each UE for sending and receiving communications data is determined by the MAC scheduler 222(N). The MAC scheduler 222(N), in turn, determines the various time intervals and frequency bands for each UE according to the QoS slice constraints for that cell 220(N).

In some implementations and as described above, the UEs that are active within the DU 220(N) may support a network slice or may be allocated or assigned to a network slice, e.g., where a network slice identifier (or slice identifier or S-NSSAI) may identify the network slice. However, different UEs (e.g., different type of UEs) and/or each different group of UEs, which may be assigned to different network slices, may have different service requirements. According to an example implementation, different UEs and/or each of multiple groups of UEs may be assigned to a different network slice.

In some implementations, each DU, e.g., DU 220(N), is configured to collect information related to a level of service over the cell and report that information back to the CU 210 over the F1 interface, e.g., F1 interface 230(N). For example, when the QoS parameter is aggregate bit rate for a network slice, the DU 220(N) collects information related to bit rates for each of the UEs assigned to the network slice. The DU 220(N) then aggregates the collected bit rates and sends feedback data 250 which, in this case, represents the aggregated bit rates. In some implementations, however, the feedback data 250 may also contain information comparing the collected, aggregated bit rate to that in the per-slice QoS constraint data 240.

Upon receiving the feedback data 250 over the F1 interface 230(N), the QoS translator 212 sends the level of service information (or traffic patterns) to the slice orchestrator 214. For example, if the collected, aggregate bit rate for a slice is less than the guaranteed minimum bit rate, then the slice orchestrator 214 may repeat the steps of determining mappings of QFIs to DRBs, DRBs to slices, and the per-slice QoS constraints such that the traffic patterns seen by the DU 220(N) will more likely satisfy the per-slice QoS constraints.

Figure 3:
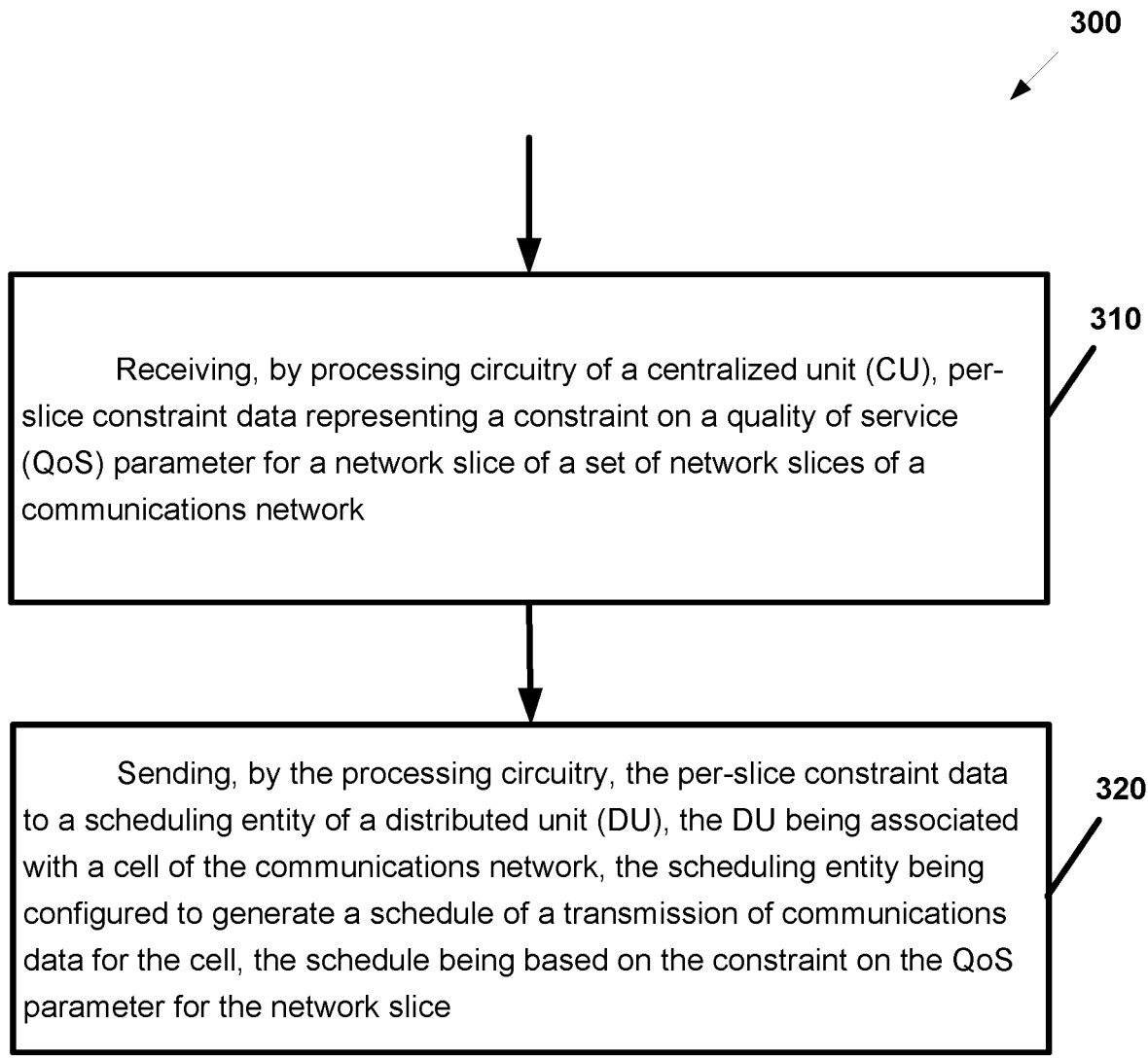
FIG. 3 is a flow chart illustrating an example operation of slice QoS enforcement.

FIG. 3 is a flow chart illustrating a method 300 of communicating per-slice QoS constraints to a DU. The method 300 may be performed by software constructs described in connection with FIG. 5, which reside in memory 506 of the computer 500 and are run by a processor 504.

At 310, the CU 210 (FIG. 2) receives per-slice constraint data 240 representing a constraint on a quality of service (QoS) parameter for a network slice of a set of network slices of a communications network. As described above with respect to FIG. 2, the takes the form of a slice identifier, a QoS parameter identifier and a per-slice constraint value. In some implementations, the per-slice QoS constraint data 240 also includes a min/max flag value indicating whether the per-slice constraint value represents a maximum allowed value or a minimum allowed value.

In some implementations, a QoS parameter is an aggregate bit rate for a network slice. In some implementations, a QoS parameter is a percentage share of air interface (e.g., F1 interface) resources allocated to the network slice. In some implementations, a QoS parameter is a packet latency for at least one data flow for a cell. Accordingly, an example of QoS constraint data 240 may take the following form: S-NSSAI=1 (slice ID), QoS parameter identifier="BIT RATE," constraint value=100 Mb/sec, and flag value="MIN."

At 320, the CU 210 sends the per-slice constraint data to a scheduling entity of a DU. The DU is associated with a cell of the communications network. The scheduling entity is configured to generate a schedule of a transmission of communications data for the cell. The schedule is based on the constraint on the QoS parameter for the network slice.

In some implementations, the scheduling entity is a MAC scheduler. In some implementations, the CU sends the per-slice constraint data to the DU over an F1 air interface. In some implementations, the DU is one of a plurality of DUs, and the per-slice constraint data is sent to those DUs having a respective UE associated with the network slice.

Figure 4:
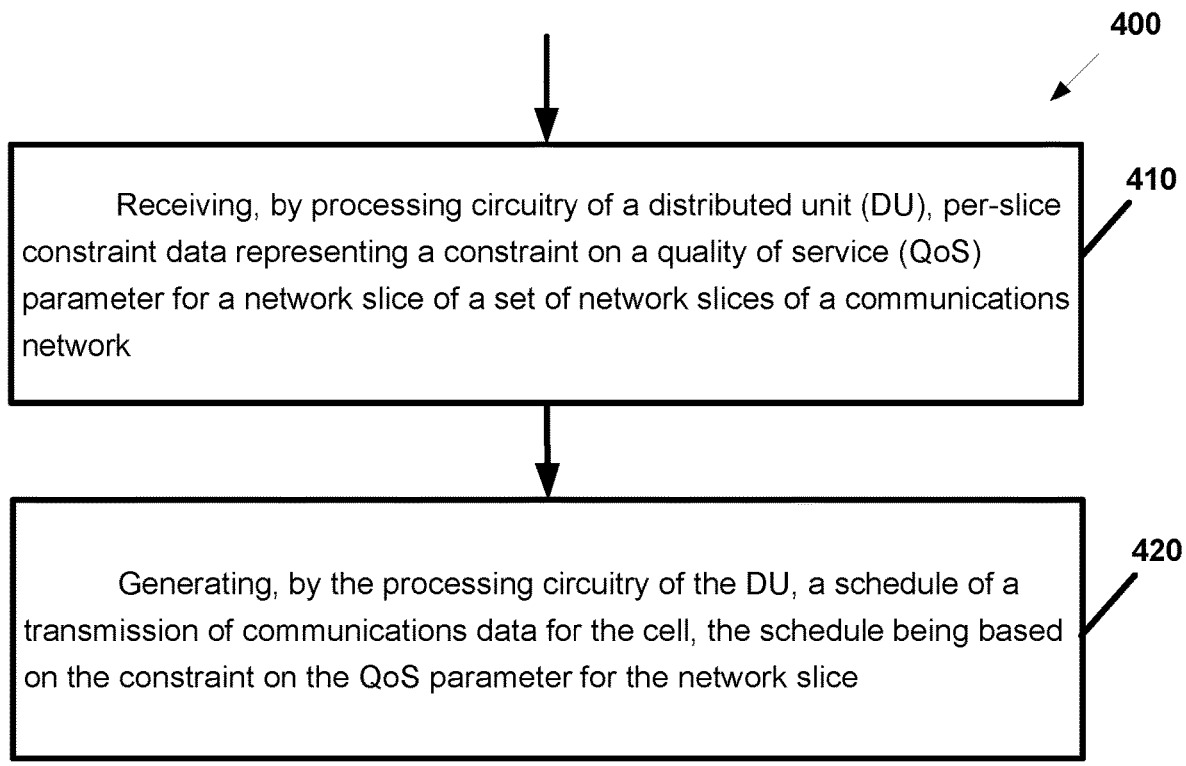
FIG. 4 is a flow chart illustrating another example operation of slice QoS enforcement.

FIG. 4 is a flow chart illustrating a method 400 of generating a schedule of transmission of communication data for a cell based on per-slice QoS constraints. The method 400 may be performed by software constructs described in connection with FIG. 5, which reside in memory 506 of the computer 500 and are run by a processor 504.

At 410, a DU (or cell) receives per-slice constraint data representing a constraint on a quality of service (QoS) parameter for a network slice of a set of network slices of a communications network. As described above with respect to FIG. 2, the takes the form of a slice identifier, a QoS parameter identifier and a per-slice constraint value. In some implementations, the per-slice QoS constraint data 240 also includes a min/max flag value indicating whether the per-slice constraint value represents a maximum allowed value or a minimum allowed value.

In some implementations, a QoS parameter is an aggregate bit rate for a network slice. In some implementations, a QoS parameter is a percentage share of air interface (e.g., F1 interface) resources allocated to the network slice. In some implementations, a QoS parameter is a packet latency for at least one data flow for a cell. Accordingly, an example of QoS constraint data 240 may take the following form: S-NSSAI=1 (slice ID), QoS parameter identifier="BIT RATE," constraint value=100 Mb/sec, and flag value="MIN."

At 420, the DU generates, via a scheduling entity, a schedule of a transmission of communications data for the cell. The schedule is based on the constraint on the QoS parameter for the network slice. In some implementations, the schedule takes the form of an allocation of a time interval and/or a frequency band for a UE associated with a slice that is active within the cell. In some implementations, the scheduling entity is a MAC scheduler. In some implementations, the CU sends the per-slice constraint data to the DU over an F1 air interface.

In some implementations, the DU sends feedback data to the CU, the feedback data representing the level of service provided by the cell for the network slice. In some implementations, the DU sends additional feedback data representing a level of service provided by the cell for each of the plurality of DRBs associated with the at least one data flow for the cell.

LIST OF EXAMPLE ABBREVIATIONS

Figure 5:
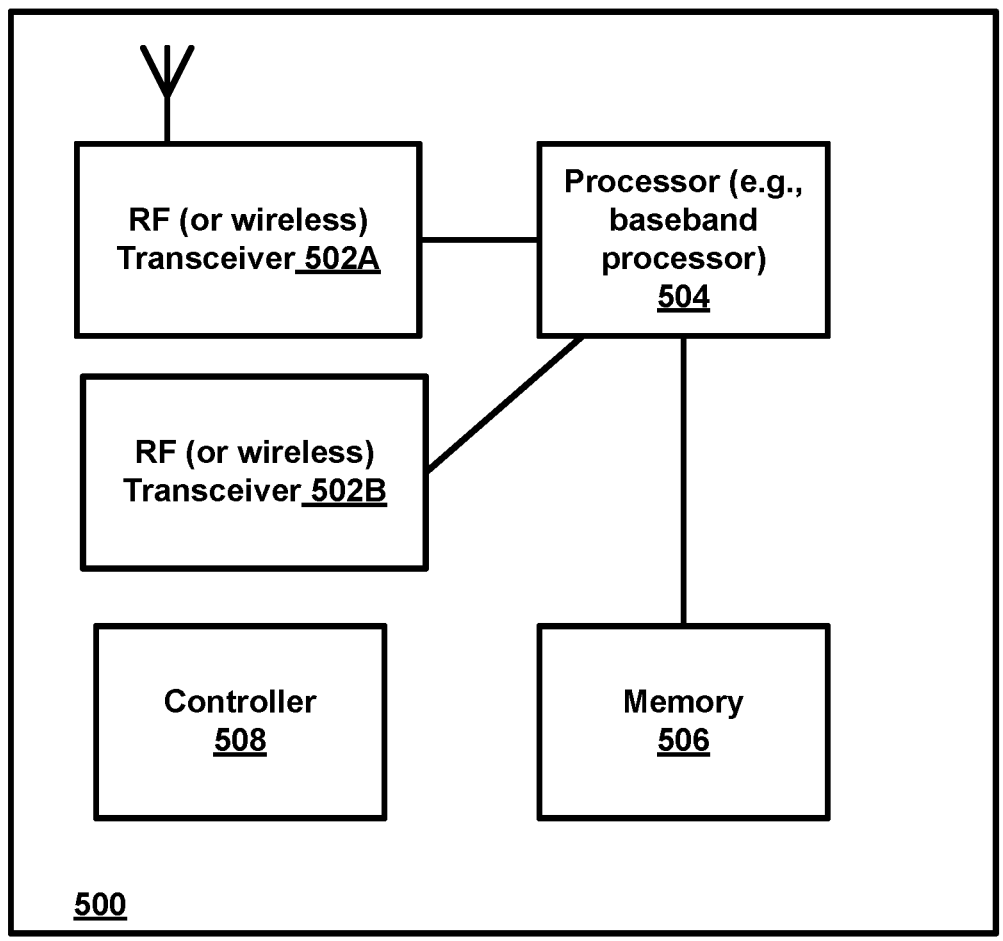
FIG. 5 is a block diagram of a node or wireless station (e.g., base station/access point, relay node, or mobile station/user device) according to an example implementation.

3GPP: third generation partnership project
4G: fourth generation of mobile telecommunication technology
5G: fifth generation of mobile telecommunication technology
5GMM: 5GS mobility management
5GS: 5G system
5GSM: 5GS session management
ACB: access class barring
AMF: access and mobility management function
CSFB: circuit switched fallback
DM: device management
DN: data network
DNN: data network name
EHPLMN: equivalent HPLMN
eMBB: enhanced mobile broadband
eNB: evolved Node B
EPS: evolved packet system
gNB: next generation Node B (uncertain)
HPLMN home PLMN
IMS: IP multimedia subsystem
IoT: internet of things
IP: internet protocol
MME: mobility management entity
MMTel: IMS multimedia telephony service
NAS: non-access stratum
NGAP: next generation application protocol
NSSAI: network slice selection assistance information
OAM: operations, administration, and management
OMA: open mobile alliance
OS: operating system
PCF: policy control function
PDU: protocol data unit
PLMN public land mobile network
RAN: radio access network
RRC: radio resource control
S-NSSAI: single NSSAI
SD: slice differentiator
SMS: short message service
SMSoNAS: SMS over NAS
SMSoIP: SMS over IP
SSAC: service specific access control
SST: slice/service type
UDM: user data management
UE: user equipment
UPF: user plane function
URLLC: ultra-reliable and low latency communication
VPLMN: visited PLMN FIG. 5 is a block diagram of a wireless station (e.g., AP, BS, eNB, UE or user device) 500 according to an example implementation. The wireless station 500 may include, for example, one or two RF (radio frequency) or wireless transceivers 502A, 502B, where each wireless transceiver includes a transmitter to transmit signals and a receiver to receive signals. The wireless station also includes a processor or control unit/entity (controller) 504 to execute instructions or software and control transmission and receptions of signals, and a memory 506 to store data and/or instructions.

Processor 504 may also make decisions or determinations, generate frames, packets or messages for transmission, decode received frames or messages for further processing, and other tasks or functions described herein. Processor 504, which may be a baseband processor, for example, may generate messages, packets, frames or other signals for transmission via wireless transceiver 502 (502A or 502B). Processor 504 may control transmission of signals or messages over a wireless network, and may control the reception of signals or messages, etc., via a wireless network (e.g., after being down-converted by wireless transceiver 502, for example). Processor 504 may be programmable and capable of executing software or other instructions stored in memory or on other computer media to perform the various tasks and functions described above, such as one or more of the tasks or methods described above. Processor 504 may be (or may include), for example, hardware, programmable logic, a programmable processor that executes software or firmware, and/or any combination of these. Using other terminology, processor 504 and transceiver 502 together may be considered as a wireless transmitter/receiver system, for example.

In addition, referring to FIG. 11, a controller (or processor) 508 may execute software and instructions, and may provide overall control for the station 500, and may provide control for other systems not shown in FIG. 11, such as controlling input/output devices (e.g., display, keypad), and/or may execute software for one or more applications that may be provided on wireless station 500, such as, for example, an email program, audio/video applications, a word processor, a Voice over IP application, or other application or software.

In addition, a storage medium may be provided that includes stored instructions, which when executed by a controller or processor may result in the processor 504, or other controller or processor, performing one or more of the functions or tasks described above.

According to another example implementation, RF or wireless transceiver(s) 502A/502B may receive signals or data and/or transmit or send signals or data. Processor 504 (and possibly transceivers 502A/502B) may control the RF or wireless transceiver 502A or 502B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Example 1

A method includes receiving, by processing circuitry of a centralized unit (CU), per-slice constraint data representing a constraint on a quality of service (QoS) parameter for a network slice of a set of network slices of a communications network; and sending, by the processing circuitry, the per-slice constraint data to a scheduling entity of a distributed unit (DU), the DU being associated with a cell of the communications network, the scheduling entity being configured to generate a schedule of a transmission of communications data for the cell, the schedule being based on the constraint on the QoS parameter for the network slice.

Example 2

According to an example implementation of Example 1, the method further includes receiving feedback data from the DU, the feedback data representing a level of service provided by the cell for the network slice; and obtaining an adjustment of the constraint on the QoS parameter based on the feedback data.

Example 3

According to an example implementation of Example 2, the network slice includes communications resources for a plurality of data radio bearers (DRBs), each of the plurality of DRBs being associated with at least one data flow for the cell, each of the plurality of DRBs having a respective value of the QoS parameter, the feedback data is first feedback data, and the method further includes receiving second feedback data from the DU, the second feedback data representing a level of service provided by the cell for each of the plurality of DRBs associated with the at least one data flow for the cell.

Example 4

According to an example implementation of Example 2, the level of service includes an aggregate bit rate for the network slice.

Example 5

According to an example implementation of Example 2, the level of service includes a share of network resources for the network slice.

Example 6

According to an example implementation of Example 3, the level of service includes a packet latency for the at least one data flow for the cell of the communications network.

Example 7

According to an example implementation of Example 1, the network slice includes communications resources for a plurality of data radio bearers (DRBs), each of the plurality of DRBs being associated with at least one data flow for the cell, each of the plurality of DRBs having a respective value of the QoS parameter, and wherein the method further includes aggregating values of the QoS parameter of each of the plurality of DRBs of the network slice to produce a value of the QoS parameter for the network slice.

Example 8

According to an example implementation of any of Examples 1-7, the QoS parameter for the network slice is an aggregate bit rate for the network slice.

Example 9

According to an example implementation of any of Examples 1-7, the QoS parameter for the network slice is share of air interface resources allocated to the network slice.

Example 10

According to an example implementation of Examples 1-7, the QoS parameter for the network slice is a packet latency for the at least one data flow for the cell of the communications network.

Example 11

According to an example implementation of Example 1, sending the per-slice constraint data to the scheduling entity of the DU includes transmitting the per-slice constraint data over an F1 interface.

Example 12

According to an example implementation of Example 1, the DU is one of a plurality of DUs, and wherein the method further includes sending the per-slice constraint data to a respective scheduling entity of a subset of the plurality of DUs, each of the subset of the plurality of DUs having a respective user device associated with the slice.

Example 13

According to an example implementation of Example 1, the scheduling entity is a media access control (MAC) scheduler.

Example 14

According to an example implementation of Example 1, the network slice includes communications resources for a plurality of data radio bearers (DRBs) associated with the network slice, each of the plurality of DRBs being associated with at least one data flow for the cell, each of the plurality of DRBs having a respective value of the QoS parameter, wherein the method further includes receiving per-DRB constraint data representing a constraint on the QoS parameter for each of the plurality of DRBs associated with the network slice; and sending the per-DRB constraint data to the DU.

Example 15

A method includes receiving, by processing circuitry of a distributed unit (DU), per-slice constraint data representing a constraint on a quality of service (QoS) parameter for a network slice of a set of network slices of a communications network; and generating, by the processing circuitry of the DU, a schedule of a transmission of communications data for the cell, the schedule being based on the constraint on the QoS parameter for the network slice.

Example 16

According to an example implementation of Example 15, the method further includes determining a level of service provided by the cell for the network slice; and sending feedback data to the CU, the feedback data representing the level of service provided by the cell for the network slice.

Example 17

According to an example implementation of Example 16, the network slice includes communications resources for a plurality of data radio bearers (DRBs), each of the plurality of DRBs being associated with at least one data flow for the cell, each of the plurality of DRBs having a respective value of the QoS parameter, the feedback data is first feedback data, and the method further includes sending second feedback data to the CU, the second feedback data representing a level of service provided by the cell for each of the plurality of DRBs associated with the at least one data flow for the cell.

Example 18

According to an example implementation of Example 16, the level of service includes an aggregate bit rate for the network slice.

Example 19

According to an example implementation of in Example 15, receiving the per-slice constraint data to the scheduling entity of the DU includes obtaining the per-slice constraint data over an F1 interface.

Example 20

According to an example implementation of Example 15, the DU is one of a plurality of DUs, and wherein each of the plurality of DUs includes a media access control (MAC) scheduler.

Example 21

An apparatus includes a centralized unit (CU), a distributed unit (DU) including a scheduling entity, the DU being associated with a cell of a communications network, and the CU being configured to send per-slice constraint data to the scheduling entity of the DU, the per-slice constraint data representing a constraint on a quality of service (QoS) parameter for a network slice of a set of network slices of the communications network.

Example 22

A computer program product includes a non-transitory storage medium, the computer program product including code that, when executed by processing circuitry of a centralized unit (CU), causes the processing circuitry to receive per-slice constraint data representing a constraint on a quality of service (QoS) parameter for a network slice of a set of network slices of a communications network; and send the per-slice constraint data to a scheduling entity of a distributed unit (DU), the DU being associated with a cell of the communications network, the scheduling entity being configured to generate a schedule of a transmission of communications data for the cell, the schedule being based on the constraint on the QoS parameter for the network slice.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:
1. A method, comprising:
receiving, by processing circuitry of a centralized unit (CU), per-slice constraint data representing a constraint on a quality of service (QoS) parameter for a network slice of a set of network slices of a communications network; and
sending, by the processing circuitry, the per-slice constraint data to a scheduling entity of a distributed unit (DU), the DU being associated with a cell of the communications network, the scheduling entity being configured to generate a schedule of a transmission of communications data for the cell, the schedule being based on the constraint on the QoS parameter for the network slice.
2. The method as in claim 1, further comprising:
receiving feedback data from the DU, the feedback data representing a level of service provided by the cell for the network slice; and
obtaining an adjustment of the constraint on the QoS parameter based on the feedback data.
3. The method as in claim 2,
wherein the network slice includes communications resources for a plurality of data radio bearers (DRBs) associated with the network slice, each of the plurality of DRBs being associated with at least one data flow for the cell, each of the plurality of DRBs having a respective value of the QoS parameter,
wherein the feedback data is first feedback data, and
wherein the method further comprises:
receiving second feedback data from the DU, the second feedback data representing a level of service provided by the cell for each of the plurality of DRBs associated with the at least one data flow for the cell and the network slice.
4. The method as in claim 2, wherein the level of service includes an aggregate bit rate for the network slice.

5. The method as in claim 2, wherein the level of service includes a share of network resources for the network slice.

6. The method as in claim 2, wherein the level of service includes packet latency for the at least one data flow for the cell of the communications network.

7. The method as in claim 1, wherein the network slice includes communications resources for a plurality of data radio bearers (DRBs) associated with the network slice, each of the plurality of DRBs being associated with at least one data flow for the cell, each of the plurality of DRBs having a respective value of the QoS parameter, and
wherein the method further comprises:
aggregating values of the QoS parameter of each of the plurality of DRBs associated with the network slice to produce a value of the QoS parameter for the network slice.

8. The method as in claim 7, wherein the QoS parameter for the network slice is an aggregate bit rate for the network slice.

9. The method as in claim 7, wherein the QoS parameter for the network slice is share of air interface resources allocated to the network slice.

10. The method as in claim 7, wherein the QoS parameter for the network slice is a packet latency for the at least one data flow for the cell of the communications network.

11. The method as in claim 1, wherein sending the per-slice constraint data to the scheduling entity of the DU includes:
transmitting the per-slice constraint data over an F1 interface.

12. The method as in claim 1, wherein the DU is one of a plurality of DUs, and
wherein the method further comprises:
sending the per-slice constraint data to a respective scheduling entity of a subset of the plurality of DUs, each of the subset of the plurality of DUs having a respective user device associated with the slice.

13. The method as in claim 1, wherein the scheduling entity is a media access control (MAC) scheduler.

14. The method as in claim 1, wherein the network slice includes communications resources for a plurality of data radio bearers (DRBs) associated with the network slice, each of the plurality of DRBs being associated with at least one data flow for the cell, each of the plurality of DRBs having a respective value of the QoS parameter,
wherein the method further comprises:
receiving per-DRB constraint data representing a constraint on the QoS parameter for each of the plurality of DRBs associated with the network slice; and
sending the per-DRB constraint data to the DU.

15. A method, comprising:
receiving, by processing circuitry of a distributed unit (DU), per-slice constraint data representing a constraint on a quality of service (QoS) parameter for a network slice of a set of network slices of a communications network; and
generating, by the processing circuitry of the DU, a schedule of a transmission of communications data for the cell, the schedule being based on the constraint on the QoS parameter for the network slice.

16. The method as in claim 15, further comprising:
determining a level of service provided by the cell for the network slice; and
sending feedback data to the CU, the feedback data representing the level of service provided by the cell for the network slice.

17. The method as in claim 16, wherein the network slice includes communications resources for a plurality of data radio bearers (DRBs), each of the plurality of DRBs being associated with at least one data flow for the cell, each of the plurality of DRBs having a respective value of the QoS parameter,
wherein the feedback data is first feedback data, and
wherein the method further comprises:
sending second feedback data to the CU, the second feedback data representing a level of service provided by the cell for each of the plurality of DRBs associated with the at least one data flow for the cell.

18. The method as in claim 16, wherein the level of service includes an aggregate bit rate for the network slice.

19. An apparatus, comprising:
a centralized unit (CU),
a distributed unit (DU) including a scheduling entity, the DU being associated with a cell of a communications network, and
the CU being configured to send per-slice constraint data to the scheduling entity of the DU, the per-slice constraint data representing a constraint on a quality of service (QoS) parameter for a network slice of a set of network slices of the communications network.

20. A computer program product comprising a non-transitory storage medium, the computer program product including code that, when executed by processing circuitry of a centralized unit (CU), causes the processing circuitry to:
receive per-slice constraint data representing a constraint on a quality of service (QoS) parameter for a network slice of a set of network slices of a communications network; and
send the per-slice constraint data to a scheduling entity of a distributed unit (DU), the DU being associated with a cell of the communications network, the scheduling entity being configured to generate a schedule of a transmission of communications data for the cell, the schedule being based on the constraint on the QoS parameter for the network slice.

* * * * *